Patented Feb. 11, 1941

2,231,495

UNITED STATES PATENT OFFICE 2,231,495

VAT-DYESTUFFS OF THE NAPHTHALIMIDE SERIES AND A PROCESS OF PREPARING THEM

Wilhelm Eckert and Otto Braunsdorf, Frankfort-on-the-Main, Germany, assignors to General Aniline & Film Corporation, a corporation of Delaware No Drawing. Application July 25, 1939, Serial No. 286,400. In Germany July 27, 1938

8 Claims. (Cl. 260—281)

The present invention relates to vat-dyestuffs of the naphthalimide series and to a process of preparing them.

We have found that valuable new condensation products of the naphthalimide series may be obtained by treating naphthalimide-4-thioglycolic acid or a substitution product or derivative thereof, particularly compounds of the following general formula:

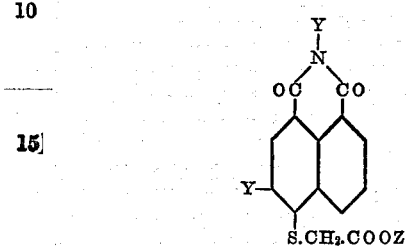

wherein X and Z represent members of the group consisting of hydrogen and alkyl and Y represents an alkoxy group, with an alkaline condensing agent, for instance with caustic potash. The treatment is preferably conducted in the presence of a liquid aromatic or liquid heterocyclic base such as aniline, dimethylaniline, pyridine or quinoline and at a temperature between about 80° C. and about 200° C. These bases are suitably used in excess, thereby acting as diluents. As diluents there may, however, likewise be used indifferent organic solvents, for instance, halogenated benzene, naphthalene chloride and the like. Besides small quantities of compounds which are insoluble in alkalies new products are formed which are soluble in alkalies. In most cases they may be transformed by cautious treatment with an oxidizing agent and with further condensation into blue bodies which have the character of vat dyestuffs. The condensation to form the vat-dyestuffs may, for instance, be performed by treating the warmed alkaline solution of the compound with a solution of sodium hypochlorite, potassium ferri-cyanide or ammonium persulfate; it even occurs by the action of the air upon the alkaline solution. Even in dilute acetic acid the oxidation may be effected by means of hydrogen peroxide or sulfuric acid.

The new vat-dyestuffs contain sulfur and nitrogen; the course of reaction, for instance, is probably as follows:

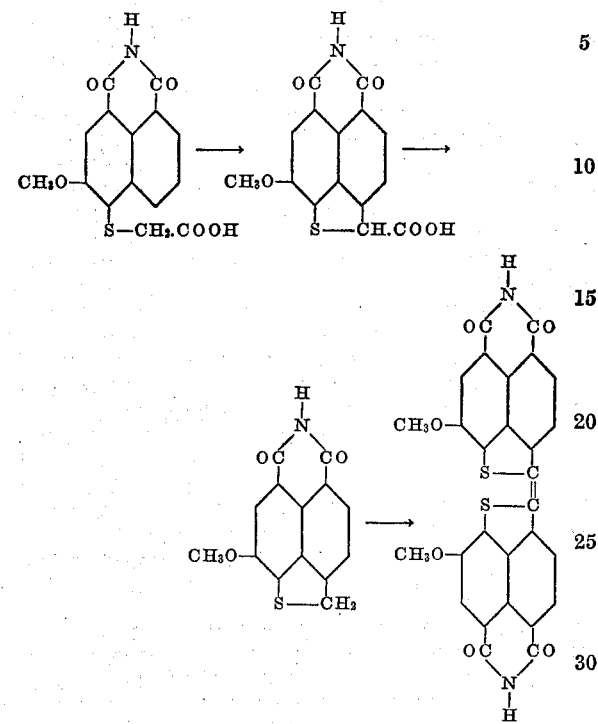

The following examples serve to illustrate the invention, but they are not intended to limit it thereto; the parts are by weight:

1. 50 parts of 3-methoxy-naphthalimide-4-thioglycolic acid (prepared, for instance, by causing 3-methoxy-4-bromonaphthalimide to react with sodium sulfide to form the corresponding mercaptan and transforming this compound into the thioglycolic acid by reaction with monochloroacetic acid; the product thus obtained crystallizes from glacial acetic acid in the form of yellow needles, melting at 290° C.) are heated to 120° C.–130° C. together with 200 parts of pulverized caustic potash in 2,000 parts of anhydrous pyridine. The whole is stirred for some hours, for instance for 5–6 hours, at this temperature.

The product separates in the form of a red-brown mass which is insoluble in pyridine. After some hours, the whole is filtered with suction, the red-brown solid matter is dissolved in water, freed by filtering from a small quantity of a grey residue which is insoluble and does not form a vat, and acidified by means of dilute hydrochloric acid. The condensation product separates in the form of a brownish precipitate: it dissolves in dilute alkalies to an orange-brown solution having a yellowish green fluorescence. In concentrated sulfuric acid it dissolves to an orange solution. In order to transform the intermediate product into the vat-dyestuff, it is dissolved in dilute caustic soda solution and dilute sodium hypochlorite solution is added to the solution at 50° C. to 60° C. until no further change occurs. The fluorescence of the solution disappears and the dyestuff separates in the form of blue flakes. It is filtered with suction, washed with hot water and dried. It forms a dark blue powder having a bronze lustre, dissolves in concentrated sulfuric acid to an olive-green solution from which, on dilution with water, it reprecipitates in the form of blue flakes. With alkali and sodium hydrosulfite the dyestuff yields a violet vat from which cotton is dyed very clear blue shades. The properties of fastness of the dyeings are good.

2. The vat-dyestuff of Example 1 may also be prepared without isolation of the intermediate product, as follows:

The aqueous orange-brown solution of the primary condensation product of Example 1 is rendered acid by means of acetic acid, whereupon it assumes a red-brown color. About 10 parts of a hydrogen peroxide solution are added and a yellow-brown precipitate is obtained which, on being heated to boiling, gradually assumes a green-blue color. When the color of the precipitate remains stable the whole is filtered with suction, the solid matter is washed with hot water and, in order to eliminate by-products which are soluble in alkalies, treated with dilute hot caustic soda solution. After washing once more with water, the purified blue dyestuff remains. It corresponds in its properties with the dyestuff of Example 1.

3. By a suitable treatment with a methylating agent, for instance dimethyl sulfate, paratoluenesulfonic acid methyl ester, the dyestuff can be methylated; it then has similar, somewhat improved fastness properties as compared with the parent dyestuff.

4. 50 parts of caustic potash are heated together with 10 parts of water to 170° C. to 180° C., 5 parts of naphthalimide-4-thioglycolic acid are then added and the whole is stirred at 190° C. to 200° C. for some time, for instance for 2-3 hours. A brown melt is formed. After cooling to about 30° C. to 40° C. the mass is dissolved in 1,000 parts of water, the solution is clarified by filtering and the condensation product is precipitated by acidifying with a dilute mineral acid. It forms a brown precipitate which dissolves in dilute alkalies or alkali carbonates to a yellow solution having a green fluorescence. In concentrated sulfuric acid the compound dissolves to a yellow solution having a vivid green fluorescence.

5. By using instead of the 3-methoxy-naphthalimide-4-thioglycolic acid mentioned in Example 1 the 3-methoxy-naphthalmethylimide-4-thioglycolic acid, prepared for instance by treating the 3-methoxy-naphthalimide-4-thioglycolic acid with p-toluenesulfonic acid methyl ester in an alkaline solution (said compound crystallizing from glacial acetic acid in yellow needles fine as hair and melting at 237° C.-239° C.) of the formula:

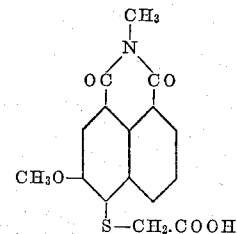

a dyestuff is obtained which has properties similar to those of the methylated dyestuff of Example 3.

6. 7.2 parts of 3-methoxy-naphthalmethylimide-4-thioglycolic acid ethyl ester obtained by heating the corresponding acid with ethylalcohol to boiling in the presence of hydrochloric acid (and forming pale yellow needles, melting at 130° C.) are heated at 90° C.-100° C., for some hours, for instance for 5 to 6 hours, together with 30 parts of caustic potash in 150 parts of anhydrous pyridine. A vivid red melt is obtained from which the reaction product separates in the form of a red-brown, insoluble mass. It is filtered with suction, dissolved in water and acidified. The brown precipitate thus obtained is filtered, washed with water and dried under reduced pressure.

The transformation of the intermediate product obtained into the dyestuff may be performed in the manner described in the preceding examples, or alternatively by heating the product at a temperature of about 90° C. to about 100° C. in sulfuric acid of 70-75 per cent strength on the water-bath. The dyestuff separates from the brown sulfuric acid solution in the form of small blue crystals; after filtering with suction through a filter stone, the dyestuff is obtained in a pure state and free from other by-products which remain dissolved in the sulfuric acid. The dyestuff obtained dyes cotton fiber from a violet hydrosulfite vat very clear blue tints; in its remaining properties, it resembles the dyestuffs described in Examples 3 and 5.

7. 7.0 parts of 3-ethoxy-naphthalmethylimide-4-thioglycolic acid ethyl ester (obtained from the 3-ethoxy-4-bromonaphthalimide by a course of reaction similar to that used for obtaining the corresponding 3-methoxy-compound and forming pale-yellow crystals, melting at 96° C.-98° C.) are stirred at 110° C.-120° C. for several hours, for instance for 5-6 hours, together with 30.0 parts of caustic potash in 200 parts of pyridine. A brilliant red-violet melt is obtained from which the reaction product separates in the form of a red-brown, solid mass which is then filtered with suction and finally washed with pyridine. In order to transform the intermediate product thus obtained into the dyestuff, it is dissolved in water; the orange-brown solution obtained having a greenish fluorescence is mixed with such an amount of glacial acetic acid that it contains about 50 per cent of acetic acid, the color of the solution changing to yellow-brown and that of the fluorescence to a vivid light-green.

On heating this solution with hydrogen peroxide to about 80° C.-90° C. the dyestuff separates in the form of shining blue flakes. It is filtered and then washed with hot acetic acid and with water; it is a dark-blue powder which dyes cotton from a blue hydrosulfite vat very clear blue tints of good fastness properties.

8. 5.0 parts of 3-ethoxy-naphthalimide-4-thioglycolic acid obtained in the manner as indicated in Example 7 (crystallizing from glacial acetic acid in the form of yellow needles, melting at 290° C.-292° C.) are heated together with 100 parts of quinoline; at 90° C.-100° C. the mixture has dissolved completely. 5.0 parts of caustic potash powder are introduced and the temperature is raised for a short time to about the boiling point of quinoline. The reaction product separates in the form of a dark-brown mass insoluble in quinoline. It is freed from the quinoline, for instance, by steam distillation. The alkaline solution obtained thereby may be transformed into the dyestuff by one of the methods described in the foregoing examples. The dyestuff is a blue powder yielding a violet vat and dyeing cotton fiber fast and clear blue tints.

We claim:

1. The process which comprises heating at a temperature of between about 80° C. and 200° C. a compound of the general formula:

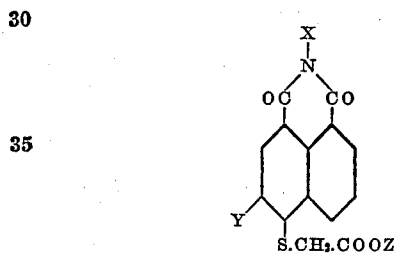

wherein X and Z represent members of the group consisting of hydrogen and alkyl, and Y represents an alkoxy group, in the presence of caustic potash and a base of the group consisting of liquid aromatic and liquid heterocyclic bases, and oxidizing the intermediate product obtained to the dyestuff.

2. The process which comprises heating for some hours at a temperature of about 120° C. to about 130° C. 3-methoxy-naphthalimide-4-thioglycolic acid in the presence of caustic potash and anhydrous pyridine, and oxidizing the intermediate product obtained to the dyestuff by heating its alkaline solution at about 50° C. to 60° C. with sodium hypochlorite solution.

3. The process which comprises heating for some hours at a temperature of about 90° C. to about 100° C. 3-methoxy-naphthalmethylimide-4-thioglycolic acid ethyl ester in the presence of caustic potash and anhydrous pyridine, and oxidizing the intermediate product obtained to the dyestuff by heating it at about 100° C. in the presence of sulfuric acid of 70 to 75 per cent strength.

4. The process which comprises heating for some hours at a temperature of about 110° C. to about 120° C. 3-ethoxy-naphthalmethylimide-4-thioglycolic acid ethyl ester in the presence of caustic potash and anhydrous pyridine, and oxidizing the intermediate product obtained to the dyestuff by heating at about 80° C.-90° C. its solution in acetic acid of 50 per cent strength with hydrogen peroxide.

5. The compounds of the general formula:

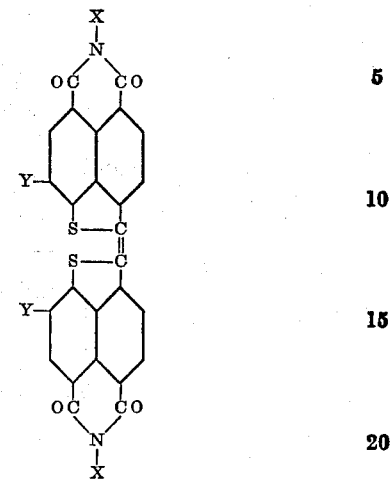

wherein X represents a member of the group consisting of hydrogen and alkyl and Y represents an alkoxy group, being vat-dyestuffs.

6. The compound of the following formula:

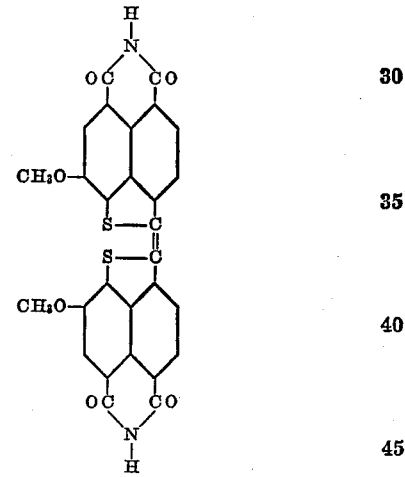

being a vat-dyestuff, dissolving in concentrated sulfuric acid to an olive-green solution and yielding on cotton from a violet vat very clear blue tints of good fastness properties.

7. The compound of the following formula:

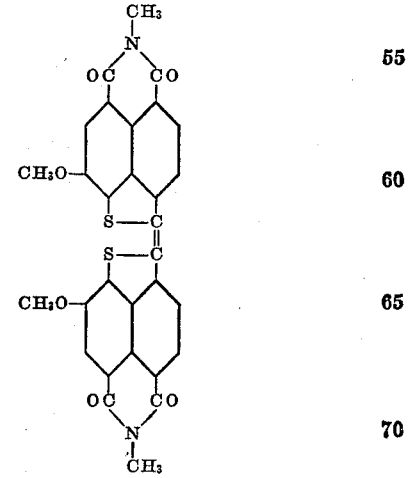

being a vat-dyestuff yielding on cotton fiber from a violet hydrosulfite vat very clear blue tints of very good fastness properties.

8. The compound of the following formula:
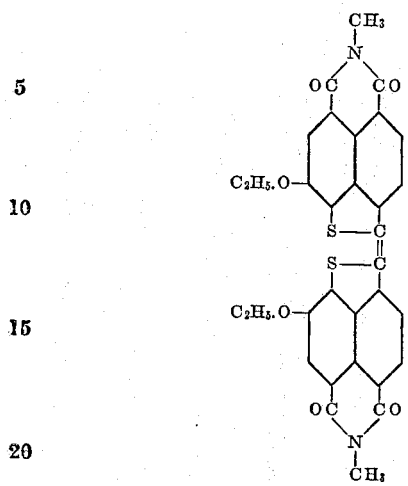
being a vat-dyestuff yielding on cotton from a blue hydrosulfite vat very clear blue tints of good fastness properties.
WILHELM ECKERT.
OTTO BRAUNSDORF.